ACOUSTIC DOCUMENT SENSOR

Filed March 26, 1968

INVENTORS
WILLIAM B. PLUMMER
TACO H. VAN DEN HONERT
MELVIN G. WILSON
BY Homer L. Kneal
AGENT

United States Patent Office 3,479,026
Patented Nov. 18, 1969

3,479,026

ACOUSTIC DOCUMENT SENSOR

William B. Plummer, Taco H. Van den Honert, and Melvin G. Wilson, Rochester, Minn., assignors to International Business Machines Corporation, Armonk, N.Y., a corporation of New York

Filed Mar. 26, 1968, Ser. No. 716,182
Int. Cl. B65h *9/20*
U.S. Cl. 271—58 9 Claims

ABSTRACT OF THE DISCLOSURE

An acoustic sensor acts as a front or a side gauge for documents in a transport. The sensor is a hollow tube attached to the document bedplate with a speaker attached to the hollow tube. In operation, the speaker is driven at constant frequency and the acoustical impedance of the hollow tube is measured by measuring the electrical impedance of the speaker. When a document moves along the transport bedplate and covers one end of the hollow tube, the acoustical impedance and thus the electrical impedance is changed. The changed impedance is detected with an impedance bridge circuit. The detection of the change may be used to control the position of the document as it is transported along the bedplate.

BACKGROUND OF THE INVENTION

The invention relates to a front or side gauge in a document transport. More particularly, the invention relates to an acoustic sensor operating as a front or side gauge in a document transport.

As the speed of data processing machines increases, the need for a very fast input-output peripheral unit for the data processing system increases. Many such input-output units work with documents. This in turn means that the documents which are read or written-on by these input-output units must travel through the units at a very high rate of speed—80 inches per second, 100 inches per second or even faster. At such high speeds, the problem of front and side gauging the documents as they are moved becomes critical.

Levers in the path of the document are no longer practical because a document when it strikes such a lever at such high speed will easily be damaged and the damaged document can then cause the document transport to jam. Also, at such high transport speeds as many as a million documents may be fed through the input-output unit in a given month. A lever which operates a manual switch would be opening and closing over a million times in a given month. A million operations of a manual switch is often its forecasted lifetime. Therefore, it would be necessary to replace manual switches once a month in such a machine. Clearly for these two reasons, a mechanical lever tripped by the document as it moves through the transport is not a practical front or side gauge when document transport speeds get very high.

An alternative solution to front and side gauging in high speed transport units is the use of radiant energy sensors. Such sensors are commonly reflective or transmissive type. A reflective radiant energy sensor is made up of a radiant energy source and a radiant energy pickup mounted on the same side of the document path. When the document moves past the sensing position, the reflection from the document is detected and used to indicate that a document is present. In a transmissive type radiant energy sensor, the radiant energy source is on one side of the document and the radiant energy pickup is on the other side. When a document moves between the source and pickup, the radiant energy is blocked and thereby the presence of a document is detected. Such a sensing device works quite well so long as the illumination of the transport path is controlled and so long as the optical path between source and pickup does not become dirty. Keeping this optical path clean has been a severe problem in the prior art.

The most significant limitation on radiant energy sensing of a document is that the illumination in the area where the sensor is placed may be under no restraint or very tight restraints, which thus prohibit the use of the radiant energy sensor. For example, a front gauge is often needed in the reading station of the optical character recognition machine. The reading station, however, is usually a radiant energy reading station in these machines, and therefore, a radiant energy document sensor would introduce unwanted or undesired light into the radiant energy reading station.

One technique which has been used to sense documents in a scanning station is a vacuum port. The vacuum port is positioned in the document path at the scanning station. When the document covers the port, the pressure in the attached vacuum tube is lowered. This reduction in pressure in the vacuum tube is sensed by a movable piston which breaks the path of a radiant energy sensor. Thus, the radiant energy sensor is used but it is not placed in the scanning station. The difficulty with such a sensing combination is that the vacuum port and the piston in the vacuum tube become very dirty. This might well be expected since the tube is sucking in air from the document path. However, once the tube and the piston become dirty, they begin to malfunction and no longer detect the presence of a document at the scanning station.

Another alternative for sensing the presence of documents without the use of radiant energy is the reflective or the transmissive type of acoustic sensor. These sensors require a sound source and a sound pickup device. The source and pickup may be on the same side (reflective type) or on opposite sides (transmissive type) of the document. Such a sensor could operate in a radiant energy scanning station without degrading the performance of the scanner. However, the major problem with acoustic, reflective-or-transmissive sensors is that they are very susceptible to noises from the outside or from the machine.

The noise problem can be somewhat reduced by constraining the acoustical path with tubes. In other words, placing a tube from the sound source to the document path and another tube from the document path back to a sound pickup device. However, such tubes being closed devices may easily become dirty just as the vacuum ports become dirty and cause a failure of the document detection function. Then too, even with tubes constraining the sound path to and from the document, the openings of the tubes at the document scan station still permit noise to enter the sound system. Accordingly, whereas transmissive and reflective type acoustical sensing systems can be used, they still have the problems of being very susceptible to noise and are apt to fail because the acoustic tubes and ports become clogged with dirt.

The problem then is how to sense the presence of a document rapidly, with no mechanical parts in the sensor, without damaging the document, and without introducing any undesired radiant energy into the document path. Also, all of this must be accomplished by a very reliable system that will remain as free from dirt and have a very long lifetime in machine operations.

It is an object of this invention to sense the presence of a document in an environment where no outside radiant energy is permitted and to do this sensing very rapidly with apparatus that will remain clean after multiple operations and will have no moving parts which can collect dirt and cause failure of the sensing.

It is a further object of the invention to sense the presence of a document with an acoustic sensor by detecting the acoustical impedance of a cavity where the configuration of the cavity can assume two shapes, one when the document is present and the other when the document is not present.

It is another object of this invention to provide a dirt free acoustic cavity for use as a document sensor with the cavity shaped so that dirt will pass through the cavity freely.

PRINCIPLE OF THE INVENTION

In accordance with the invention, the above objects are accomplished by providing an acoustic cavity with a port opening onto the document transport path. The acoustic cavity is driven by a speaker operating at a constant frequency. The frequency may be sonic or ultrasonic and sound when used hereinafter means mechanical pressure waves through a medium. When a document covers the port of the cavity, the acoustical impedance of the cavity is changed and in turn the electrical impedance of the speaker is changed. Thus, the electrical impedance of the speaker may be monitored to detect when a document is positioned over the port or orifice opening into the acoustic cavity.

As an important subfeature of the invention, the acoustic cavity is also provided with an open port at the bottom of the cavity so that dirt entering at the top through the document sensing port will fall through the cavity and not be collected in the cavity.

The invention has several advantages over the prior art. The most significant is its reliability due to its dirt-free operation. There are next to no moving parts in the acoustic sensor since the only motion is the small vibrations of the speaker cone or diaphragm. Further, the sensor does not use a pickup device but rather it monitors a sound source or sound generating device to detect changes in its operation caused by the presence of a document. Since no sound pickup is involved, the system is absolutely free of any noise problems. Also, for a given energy injected into the source the signal obtained across the impedance detector is ten to twenty times that obtained from a pickup in the reflective or transmissive acoustic sensor previously described. Further, the cavity provided is a hollow tube vertically positioned under the transport bedplate. Such a hollow tube permits the dirt falling into the cavity to pass all the way through the cavity. The cavity remains clean and this increases its reliability. Finally, the acoustic sensor has very low cost as it can be made up from mass-produced earphone speakers and molded plastic tubes.

The foregoing and other objects, features and advantages of the invention will be apparent from the following more particular description of a preferred embodiment of the invention, as illustrated in the accompanying drawings.

DESCRIPTION

Figures 1, 2:
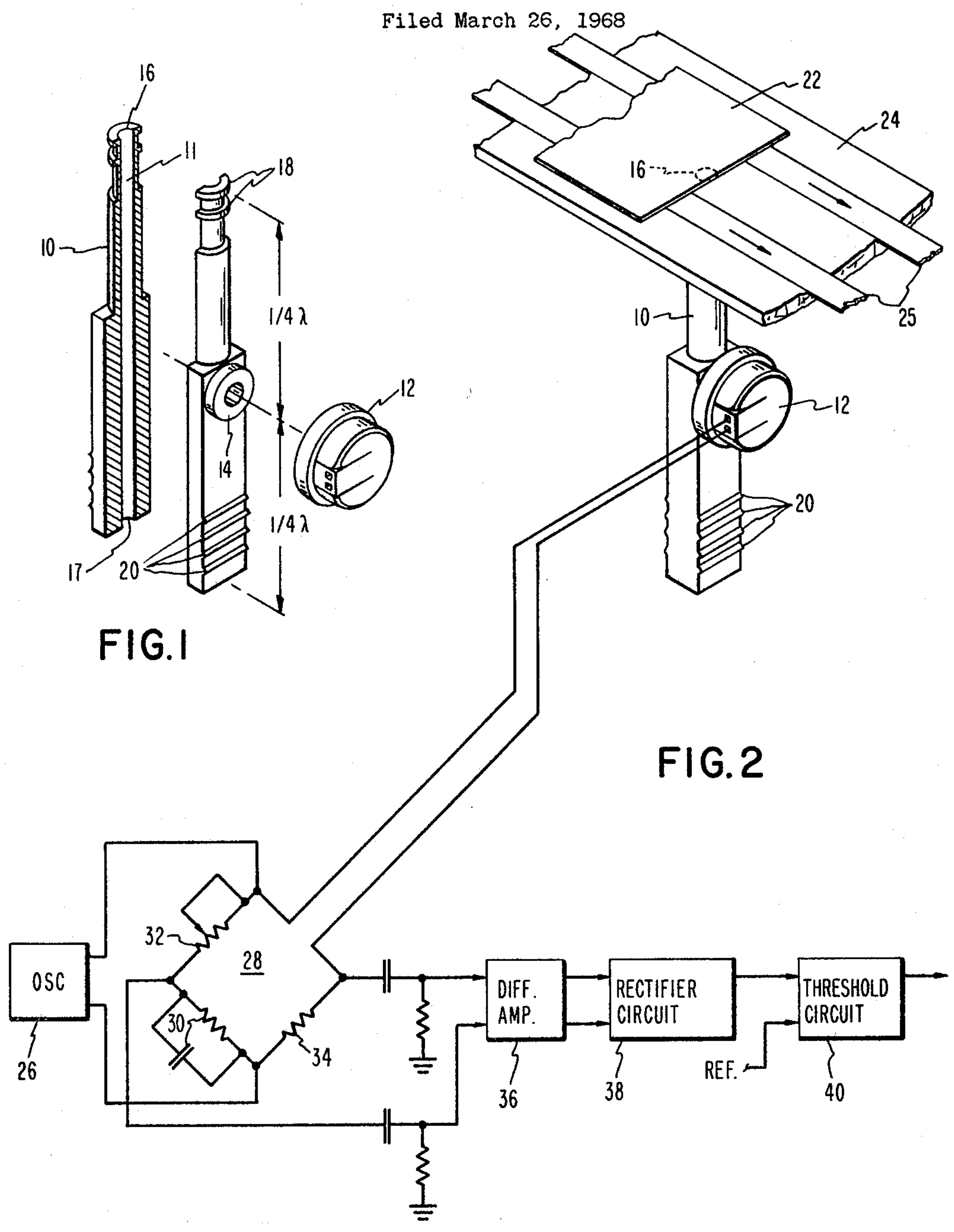
FIG. 1 shows a cutaway of the tube forming the acoustic cavity and also the earphone exploded out from the orifice to which the earphone attaches.
FIG. 2 shows the acoustic sensor assembled in a document transport with attached circuitry for sensing the change in acoustical impedance by sensing the change in electrical impedance of the earphone.

In FIGURE 1 the structure of the acoustic sensor is shown. The sensor is made up of a tube 10 having an acoustic cavity 11 and an earphone 12 attached at the middle of the tube 10 to the cavity 11 through orifice 14. The length of the cavity 11 is one-half the wave-length $\lambda$ of the acoustical wave generated by the speaker 12. The speaker 12 is an earphone commonly found in many commercial portable audio systems. Here the earphone is driven at a constant frequency.

The orifice 14 to which the speaker 12 is mounted in at the middle of the tube 10. Accordingly, there is a one quarter wavelength ($\frac{1}{4}\lambda$) distance or an odd integer multiple thereof from the source of the sound to each opening of the tube. When both ends of the tube are opened, a standing wave is set up in the tube 10, and the system is oscillating at its natural frequency. When the top orifice 16 of the tube is closed by a document, the standing wave pattern in the acoustic cavity 11 is destroyed. This changes the acoustical impedance of the cavity and in turn changes the electrical impedance of the speaker 12. The change in electrical impedance is sensed in the circuitry of FIGURE 2 which will be discussed shortly.

As just pointed out in discussing FIGURE 1, the speaker 12 is attached ¼ wavelength above the bottom orifice 17 of cavity 11. This is equivalent to closing the cavity 11 just below the point where speaker 12 is attached. In other words, the sensor would operate the same as in FIGURE 1 if the cavity 11 was only ¼ wavelength long, and if orifice 16 was at one end of the cavity and speaker 12 at the other end. However, such a closed cavity would collect dirt. By opening the other end of the cavity with a ¼ wavelength open end attachment, dirt passes through the cavity 11, and the cavity remains clean and operative.

The outside shape of the tube 10 aids installation but is not critical to the invention. The flanges 18 provided at the top of the tube 10 serve to lock the tube into a document bedplate when the tube is inserted into the bedplate. Similarly, the rectangular shape of the bottom of the tube 10 and the ridges 20 at the bottom of the tube 10 merely provide a convenient finger gripping point. To install the tube in a bedplate an operator merely grips the tube at the ridges 20 and inserts the end 16 of the tube 10 into the bedplate until the flanges 18 have secured the tube in the bedplate. Likewise, the speaker element 12 has a force fit male coupling whereby it may be attached to the orifice 14.

Now referring to FIGURE 2, a document 22 is shown being transported along a bedplate 24 by belts 25 to a point where it covers the top orifice 16 of the tube 10.

The speaker 12 is driven by an oscillator 26 operating through a bridge circuit 28. The resistive-capacitive network 30 in the bridge circuit 28 is used to balance the resistive-inductive impedance of the speaker 12. The variable resistance 32 and the fixed resistance 34 are used to balance the other legs of the bridge circuit. An unbalance in the bridge circuit is detected by difference amplifier 36 which is AC coupled to the bridge circuit 28. The AC coupling means the difference amplifier will only amplify imbalances due to the AC signal from the oscillator.

Both sides of the difference amplifier 36 provide output signals to a rectifier circuit 38 which converts the AC difference signal to a DC level and applies the DC level to a threshold circuit 40. The threshold circuit 40 has a reference level also applied thereto so that when the output from the rectifier circuit exceeds the reference voltage, the threshold circuit has an output.

In operation, with no document covering the orifice 16 of the acoustic tube 10 an operator adjusts the variable resistance 32 to obtain minimum output from the difference amplifier 36. With the bridge circuit shown, the minimum signal was approximately one-half volt peak-to-peak. This minimum could be made lower by providing a reactive adjustment in the bridge circuit also.

With the bridge circuit adjusted, a document is fed along the bedplate. Eventually the document covers the orifice 16 and thereby changes the acoustical impedance of the tube 10. The change in acoustical impedance changes the electrical impedance of the earphone 12. As a result of this change in electrical impedance of the earphone 12, the bridge circuit 28 becomes unbalanced, and the difference amplifier has an output of about four volts peak-to-peak. The output from the difference amplifier is passed to the rectifier circuit 38 which converts the peak-to-peak signal into a DC level and passes the DC level to the threshold circuit 40. The DC level, generated because of the four volt peak-to-peak signal from the difference amplifier 36, exceeds the reference level and causes the threshold circuit 40 to have an output. The output from the threshold circuit 40 indicates that a document has been detected at the position of the orifice 16 in the bedplace. This signal might be used to stop the document movement or merely to indicate that the document is passing that point on the bedplate.

It will be obvious to one skilled in the art that many types of impedance measurement schemes might be used to measure the change in electrical impedance of the earphone 12. The particular schematic block diagram shown represents just one way of sensing the electrical impedance change and is not important to the invention.

On the other hand, it is most important to the invention to note that the document sensor as embodied by the acoustic cavity 11 having an open end 16 and a driver 12 is a very simple and a very reliable device. There are no moving parts which may become dirty or worn and also the tube 10, which forms the resonant cavity 11, is open ended at both ends so that dirt in the document bedplate which happens to fall into the tube will pass cleanly through the tube without causing a failure of the document sensing system. In addition, the sensor might be placed in an optical read station without disrupting the optical reading because here there is no light involved in the sensing of a document position.

While the invention has been particularly shown and described with reference to a preferred embodiment thereof, it will be understood by those skilled in the art that various changes in form and details may be made therein without departing from the spirit and scope of the invention.

What is claimed is:

1. In a document transport, a document sensor comprising:

a document guide;

an acoustic cavity attached to said guide, said cavity having an orifice that opens onto the document path;

sound generating means attached to said acoustic cavity for generating sound waves in the cavity;

means responsive to said sound generating means for detecting the change in acoustical impedance of said cavity when a document covers the cavity's orifice.

2. In a document transport, the document sensor of claim 1 wherein:

said sound generating means generates sound waves of a predetermined wavelength and is attached at the end of the cavity opposite the orifice $n/4$ wavelengths from the orifice, where $n$ is an odd integer, so that a standing wave exists in said cavity until a document covers the orifice.

3. In a document transport, the document sensor of claim 1 wherein:

the cavity has a second orifice at the end of the cavity opposite the orifice that opens onto the document path so that dirt, which enters the cavity, has clear passage through the cavity, and the cavity remains clean.

4. In a document transport, the document sensor of claim 3 wherein:

said sound generating means generates sound at a predetermined wavelength;

said cavity is $n/2$ wavelengths long, where $n$ is an integer;

said sound generating means is attached to said cavity $k/4$ wavelengths from each orifice of the cavity, where $k$ is an odd integer and may be different for each orifice, so that a standing wave exists in said cavity until a document covers the orifice opening onto the document path.

5. A front or side gauge in a document transport comprising:

an acoustical cavity at a document sensing station in the transport;

means for driving said cavity with acoustical energy;

means for changing the configuration of the cavity when a document arrives at the sensing station;

means for detecting the change in acoustical impedance of said cavity when the cavity's configuration is changed due to a document arriving at the sensing station.

6. The front or side gauge of claim 5 wherein:

said driving means generates acoustical energy of a constant frequency identical to the natural frequency of said cavity so that, when the configuration of the cavity is changed, the natural frequency of the cavity changes and is different from the constant frequency of the acoustic energy from said driving means.

7. The front or side gauge of claim 5 wherein:

said cavity has two orifices, a first orifice at the document sensing station and a second orifice positioned lower than the first orifice so that dirt entering the cavity at the first orifice will fall through the cavity and out the second orifice.

8. In a document transport having a document bedplate and means for moving documents along the bedplate, a document sensor comprising:

a hollow tube open at both ends and attached to the bedplate, a first end of the tube being flush with the bedplate surface and a second end being positioned below the first end so that any dirt entering said tube falls through the tube;

a speaker connected to the hollow of said tube for generating a soundwave of constant wavelength in said tube;

a drive circuit for driving said speaker at a constant frequency;

means responsive to said drive circuit for detecting a change in electrical impedance of said speaker so that when a document moves along the bedplate and covers the first end of said hollow tube, the change in electrical impedance of said speaker is detected.

9. The document sensor of claim 8 wherein:

said hollow tube is $n/2$ wavelengths long where $n$ is an integer;

said speaker is connected to the hollow of said tube $k/4$ wavelengths from each end of the tube where $k$ is an odd integer and may be different for each end so that a standing wave exists in said tube until a document covers the first end of said tube.

References Cited

UNITED STATES PATENTS

| | | | |
|---|---|---|---|
| 3,342,480 | 9/1967 | Camerini | 271—58 |
| 3,190,644 | 6/1965 | Schwebel | 271—60 |

RICHARD E. AEGERTER, Primary Examiner